United States Patent
Kocsis, Jr.

[11] Patent Number: 6,038,810
[45] Date of Patent: Mar. 21, 2000

[54] PLANT ENCLOSURE FOR OUTDOOR USE

[76] Inventor: John Joseph Kocsis, Jr., P.O. Box 820, Beamsville, Ontario, Canada, L0R 1B0

[21] Appl. No.: 08/796,441

[22] Filed: Feb. 10, 1997

[51] Int. Cl.[7] .................................................. A01G 13/02
[52] U.S. Cl. ..................................................... 47/21; 47/30
[58] Field of Search ................................... 47/30, 21, 26

[56] References Cited

U.S. PATENT DOCUMENTS

| 4,711,051 | 12/1987 | Fujimoto | 47/30 |
| 4,829,707 | 5/1989 | Koffler et al. | 47/30 |
| 5,423,148 | 6/1995 | Thornhill | 47/21 |
| 5,426,887 | 6/1995 | Spencer et al. | 47/30 |
| 5,479,741 | 1/1996 | Underwood | 47/30 |
| 5,505,020 | 4/1996 | North | 47/30 |

FOREIGN PATENT DOCUMENTS

| 1003303 | 3/1952 | France | 47/30 |
| 1032163 | 6/1953 | France | 47/30 |
| 2621441 | 4/1989 | France | 47/30 |
| 2231875 | 1/1974 | Germany | 47/30 |

Primary Examiner—Michael J. Carone
Assistant Examiner—Joanne C. Downs
Attorney, Agent, or Firm—Adrian Zahl

[57] ABSTRACT

A plant enclosure for outdoor use has a hollow body with open upper and lower ends and ventilation and drainage openings. In order to permit a desired amount of water to be conserved within the base of the enclosure, the openings are positioned such that a portion of the body may be buried in the soil, with the openings spaced above the soil surface. The base of the body has plant root openings, positioned to be buried beneath the soil surface. These openings are sized to permit plant roots to grow laterally outwardly close to the soil surface, beyond the perimeter of the enclosure. A lid is engageable to the upper rim of the body. The lid have a recessed portion on its upper surface to that capture rain or sprinkler water. Apertures within the lid permit the captured water to drain into the enclosure. Preferably, the body and lid are clear or translucent to create a greenhouse effect during daylight hours.

12 Claims, 6 Drawing Sheets

PLANT ENCLOSURE FOR OUTDOOR USE

FIELD OF THE INVENTION

The present invention relates to a portable enclosure for covering an individual outdoor plant. The enclosure is intended to protect against animal predators and the elements and to conserve heat and water.

BACKGROUND OF THE INVENTION

Outdoor plants, particularly vegetables planted in home gardens, face significant pressure from predators, heavy rain and hail, especially in the spring when the plants are small. Even a hard spray of water from a sprinkler can damage small plants. As well, cool temperatures can inhibit plant growth and a late season frost can kill or damage some plants. In order to address these various pressures, it is desirable to provide an enclosure that may be placed around an individual plant or a small group of plants, to protect them from predators and the elements and to generate daytime warmth through a greenhouse effect. Ideally, such an enclosure should be simple, inexpensive and easy to store.

Predators that attack vegetable plants most commonly consist of mice. In some regions, deer, woodchucks and raccoons can be a problem. An enclosure that protects against these various predators should be relatively sturdy, resistant to attack by chewing, and be insertable below the soil surface to stabilize the enclosure and inhibit animals from burrowing under the enclosure.

A further desirable feature is for the enclosure to be able to capture a limited amount of water for saturation of the soil around the plant. This permits a more efficient watering of the plant and allows rainwater to be captured before it runs off. The plant may be watered by simply pouring a relatively small amount of water into the enclosure; this is a more efficient watering means than watering an entire garden with a sprinkler. Water retention means permits essentially all of this water to soak into the soil around the plant roots, rather than being lost through runoff, evaporation, or misdirection. Water capture and retention means can also be integrated with means to break the force of a hard rain or sprinkler watering.

There exist several types of plant enclosures that serve one or other of the functions identified above. For example, FIG. 1 shows a prior art enclosure intended to protect a tomato or other plant against nighttime freezing. The enclosure comprises a tubular structure, open at the ends, with the sidewall comprising water-filled channels that trap the daytime heat for slow release at night. This type of enclosure, however, provides minimal protection against predators and is not partly buried. The open top does not permit it to capture heat through a greenhouse effect. Many gardeners also resort to wire enclosures and electric fences for protection against predators. Obviously, these devices are effective only against relatively large predators and do not provide any protection against the elements. As well, some gardeners resort to the use of greenhouse-like "cold frames" for starting plants. However, this approach requires that the plants be transplanted when they are partly grown.

Once a plant has outgrown the need for an enclosure, the enclosure must be either removed or, if the enclosure remains in place, it must be able to accommodate a growing plant. A removable enclosure must be capable of being unwrapped from around the plant; this typically requires a flexible sidewall with a fastening means. These features tend to-leave the enclosure vulnerable to attack by chewing predators. Thus, it is desirable to provide an enclosure that comprises a relatively rigid, hollow housing with a removable lid that may be removed when the plant outgrows the enclosure. The enclosure is then simply left in the field, with the plant growing out of the top. Such an enclosure continues to provide residual protection against such predators as mice, which would otherwise attack the base of a plant.

A further requirement of an enclosure is that the enclosure should be adapted to be partly buried in the soil. This both supports the enclosure and deters small burrowing predators such as mice from attacking the plant. However, since at least some of the roots of a typical garden plant grow laterally outwardly close to the soil surface, it is necessary to provide means for the roots to grow through the buried portion of the enclosure If this is not present, growth of surface roots may be inhibited.

SUMMARY OF THE INVENTION

The objects of the present invention are to provide a plant enclosure for outdoor use that meets the following objects:

a) relatively inexpensive and simple to manufacture;
b) stackable for storage;
c) reasonable protection against predators;
d) protection against excessive rain and hail;
e) means to capture heat from the sun with a greenhouse effect; and
f) means to permit plant roots to grow laterally outwardly through a buried portion of the enclosure.

In light of these objects, the present invention comprises in its broadest aspect a plant enclosure for outdoor use, comprising a hollow body having a sidewall and open upper and lower ends. At least one ventilation and drainage opening extends through the sidewall generally adjacent the lower rim of the enclosure. In order to permit a desired amount of water to be conserved within the enclosure, the opening is positioned in the base region of the body and spaced sufficiently above the lower rim to permit a portion of the body to be buried in the soil, with the opening still spaced above the soil surface. This permits a fixed amount of water to be retained within the base of the enclosed. Preferably, the opening is spaced about 4–5 inches above the lower rim, to permit the body to be buried by about three inches with the opening positioned about 1–2 inches above the soil surface. This permits about 1–2 inches of water to accumulate within or be poured into the base of the enclosure and slowly seep into the soil at the base of the plant. Any excess water over this amount will drain out through the opening. The ventilation and drainage opening may be sized to permit the entry of bees to permit pollination of the plants. The size of the opening will vary depending on the region of intended use to meet this requirement, although within North America the size requirement is relatively constant. The lower rim of the enclosure is generally sinusoidal in shape, which provides an array of plant root openings positioned below the ventilation opening and positioned to be buried beneath the soil surface. These openings are sized to permit plant roots to grow laterally outwardly close to the soil surface, beyond the perimeter of the enclosure while inhibiting burrowing animals from entering the enclosure.

A lid is engageable to the upper rim of the body. Preferably, the lid incorporates water-capture means, such as a recessed portion on its upper surface, that captures rain or sprinkler water. Apertures within the lid permit the captured water to drain into the enclosure. Preferably, the body and lid are clear or translucent to create a greenhouse effect during daylight hours. The body may be tapered outwardly and upwardly to permit stacking when the devices are in storage, and also to efficiently enclose a plant.

The plant root openings within the base may comprise an array of downwardly-depending fingers, with gaps between the fingers spaced to permit plant roots to grow laterally outwardly beyond the perimeter of the enclosure.

A removable cover may be provided to protect the enclosed plants against nighttime frost.

The directional references used herein relate to the device as positioned in its normal installed position on a generally horizontal plot of ground.

DETAILED DESCRIPTION OF THE PREFERRED EMBODIMENT

Figure 1:
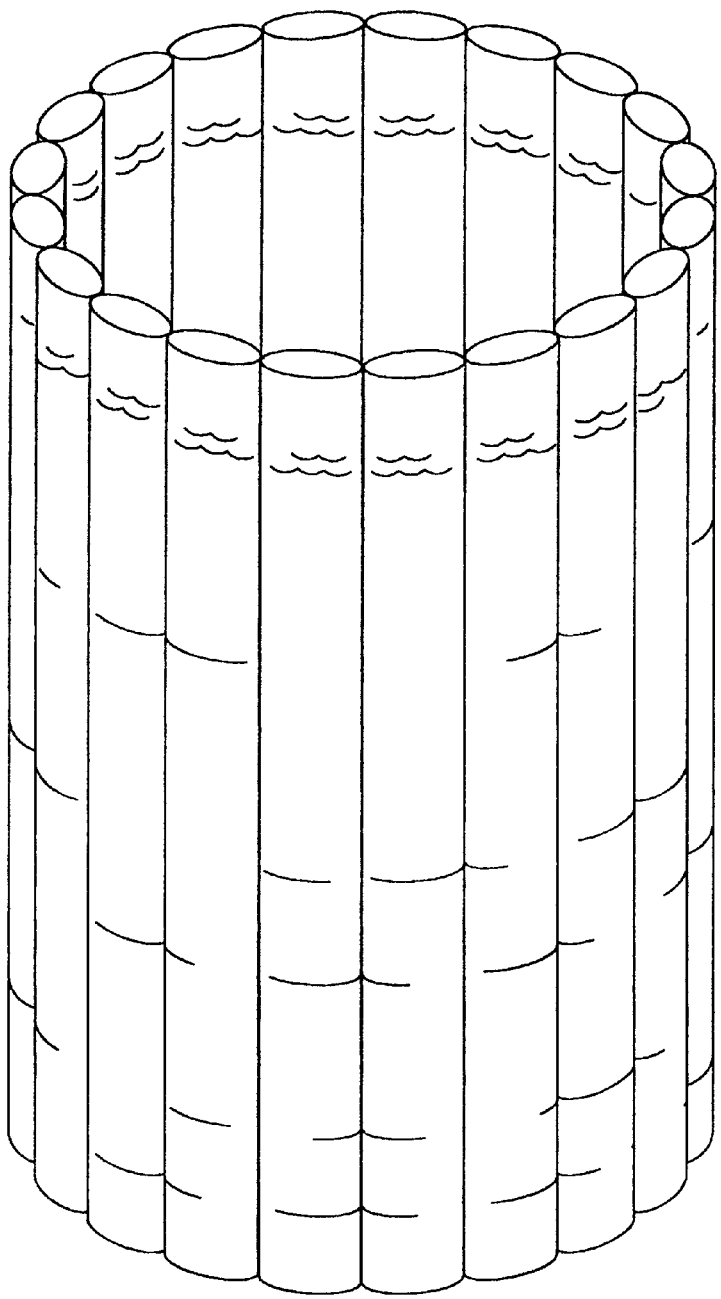
FIG. 1 shows a prior art plant enclosure.
Figure 2:
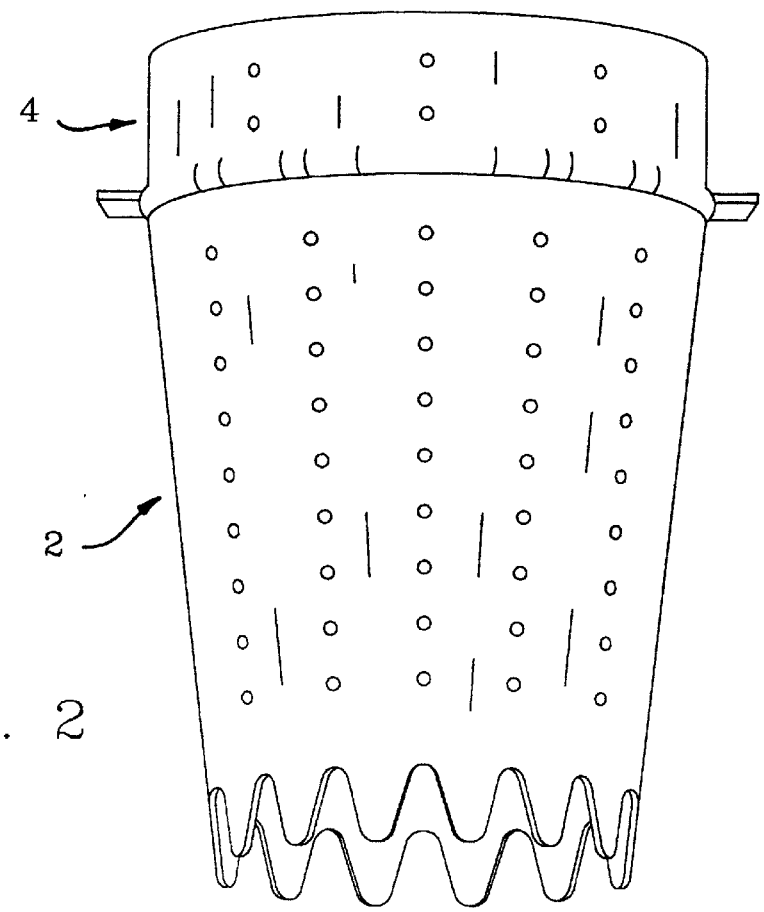
FIG. 2 is a perspective view of the present invention, with the lid installed.

As seen in FIG. 2, the enclosure comprises a body 2 having an open top and a truncated cone shape, with the wide end facing upwardly, and a lid 4. The body is hollow and open at its upper and lower ends. The tapering of the body permits the devices to be stacked together when in storage and permits it to accommodate a typical plant that is bushier at its upper portion.

Figure 3:
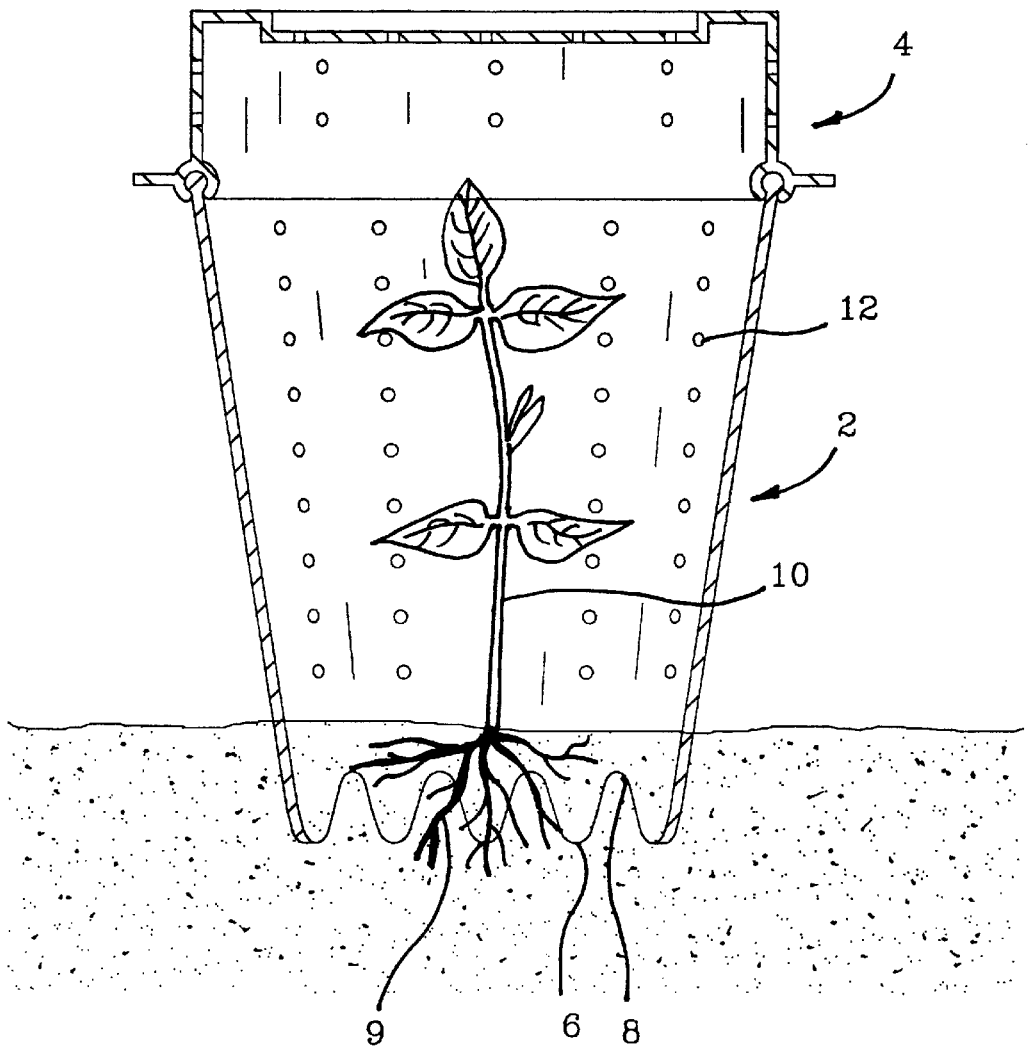
FIG. 3 is a side elevational view of the invention, partly in section and partly buried within a plant bed.

When the enclosure is partly buried within a garden with a plant growing inside the enclosure, as seen in FIG. 3, it is desirable to provide a means whereby the enclosure may be partly buried and the plant roots may be permitted to grow laterally outwardly, close to the soil surface, beyond the perimeter of the enclosures This need is met by providing an array of openings extending through the lower portion of the enclosure. The openings in the preferred embodiment consist of the base of the enclosure having a generally sinusoidal shape to comprise an array of downwardly-depending fingers 6, with gaps 8 between the fingers. The gaps are sized to permit the roots 9 of a typical garden plant 10, fully grown, to extend through the gap.

The body 2 is fabricated from clear or translucent plastic, and may be either injection molded or thermoformed from a sheet of plastic. Preferably, the body should be relatively rigid and at least about 1/8" thick to deter gnawing predators such as mice. As well, the body should present a generally smooth outside surface, particularly at its base, so as not to provide a mouse with a starting point for gnawing through the enclosure.

An array of apertures 12 extends along the sides of the body, commencing partway up from the base of the body. The apertures permit both ventilation, to prevent overheating of the enclosure when the sun is shining, and drainage. The apertures commence about four to five inches above the base of the body. When the enclosure is buried about 3" below the soil surface, the apertures will commence about 1.5" above the surface. It will be understood that the ventilation holes may be replaced with slots or any other suitable ventilation openings. The apertures also serve to drain away excess water from within the enclosure. The positioning of the apertures is important, since it is necessary that they be positioned above the soil surface when the enclosure is partly buried, such that about 1–2 inches of water may be retained within the base of the enclosure, with excess water above this amount being drained. This permits the enclosure to retain a desired amount of water, for to be soaked slowly into the soil around the plant roots.

Ideally, the apertures are sized to permit the entry of a variety of bees into the enclosure to permit pollination of the plants.

Figure 5:
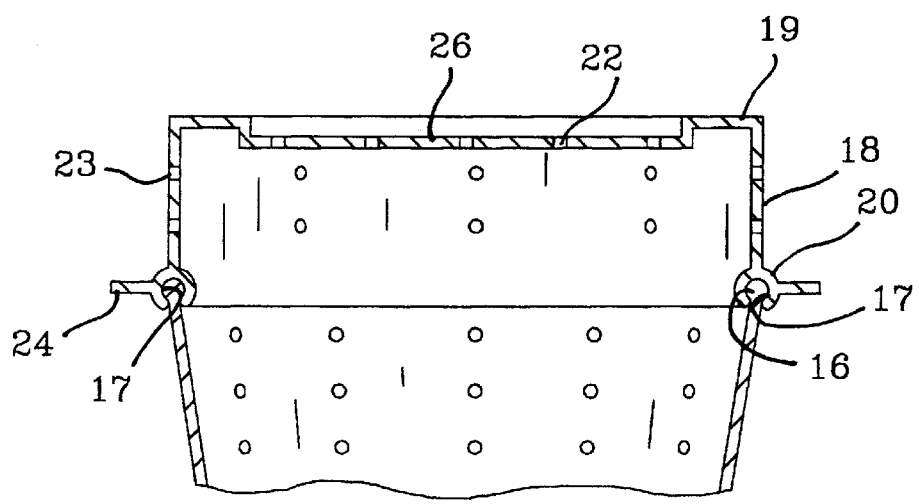
FIG. 5 is a side elevational view, in section, of the lid and upper part of the enclosure.
Figure 6:
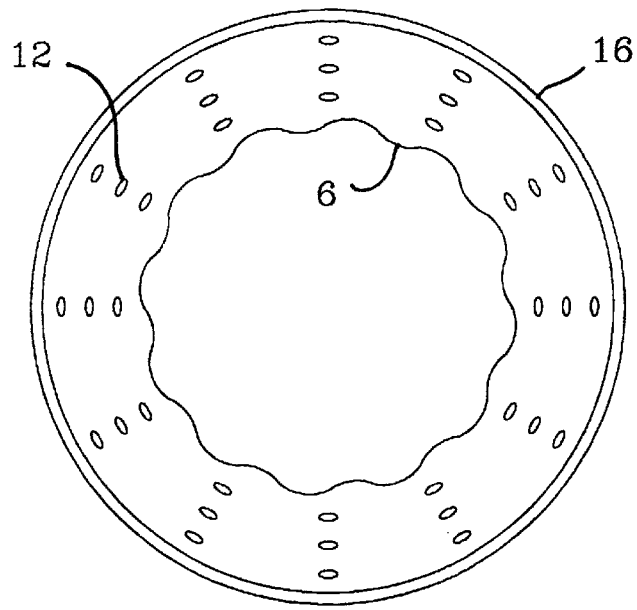
FIG. 6 is a top plan view of the enclosure with the lid removed.
Figure 7:
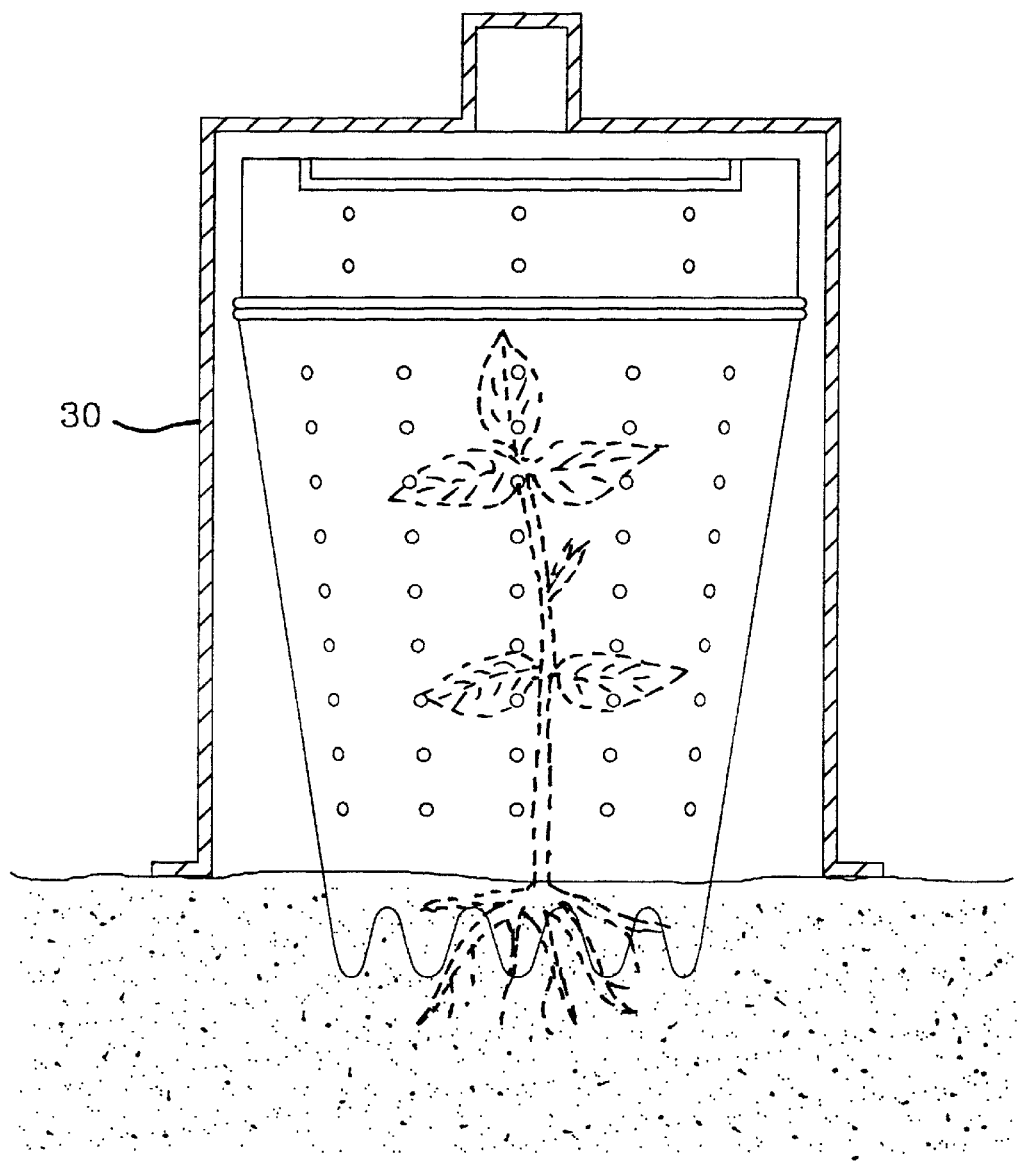
FIG. 7 is a side elevational view of the device, with protective frost cover installed.

The upper edge of the body is characterized by means for engaging the lid, comprising a thickened rim 16 encircling the rim of the body, as seen in FIGS. 5 and 7. The rim 16 mates with a corresponding groove 17 within the lower rim of the lid to permit the lid to be releasably snap-locked to the body.

Figure 4:
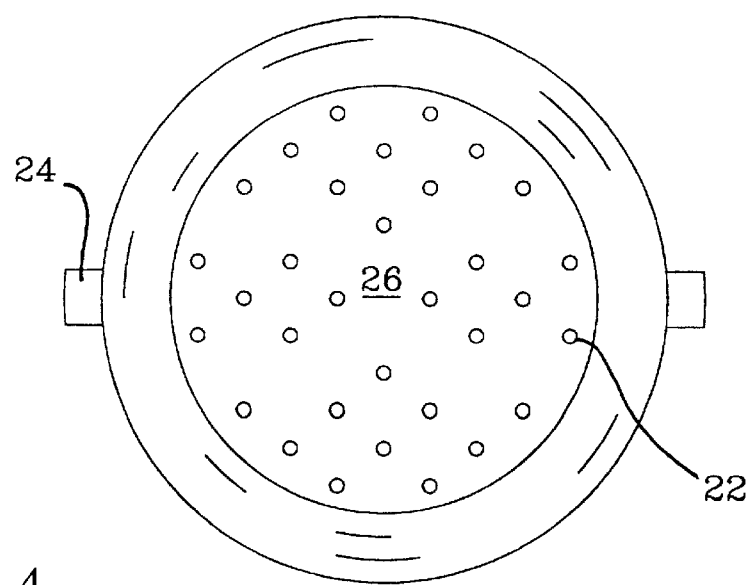
FIG. 4 is a top plan view of the lid.

Referring to FIGS. 4 and 5, the lid 4 is clear or translucent, and is similarly injection molded or thermoformed. The lid is generally cylindrical in shape, with a generally vertical sidewall 18 and a flat top 19. The sidewall terminates at its lower edge in a thickened rim 20. The groove 17 is recessed into the lower face of the rim 20. The top is perforated by an array of apertures 22, which serve to admit rain and provide ventilation. Side apertures 23 within the lid provide additional ventilation. The lid may be removed when the plant has grown enough that the enclosure is no longer required.

A pair of tabs 24 extend radially outwardly from the base of the lid to assist in removal of the lid.

The upper surface of the lid is characterized by a recessed central region 26, which comprises water capture means. The apertures 22 drain water from the recess into the enclosure. The apertures are sufficiently small to permit the water to enter the enclosure in a relatively fine spray to avoid damaging a young plant within the enclosure.

Figure 8:
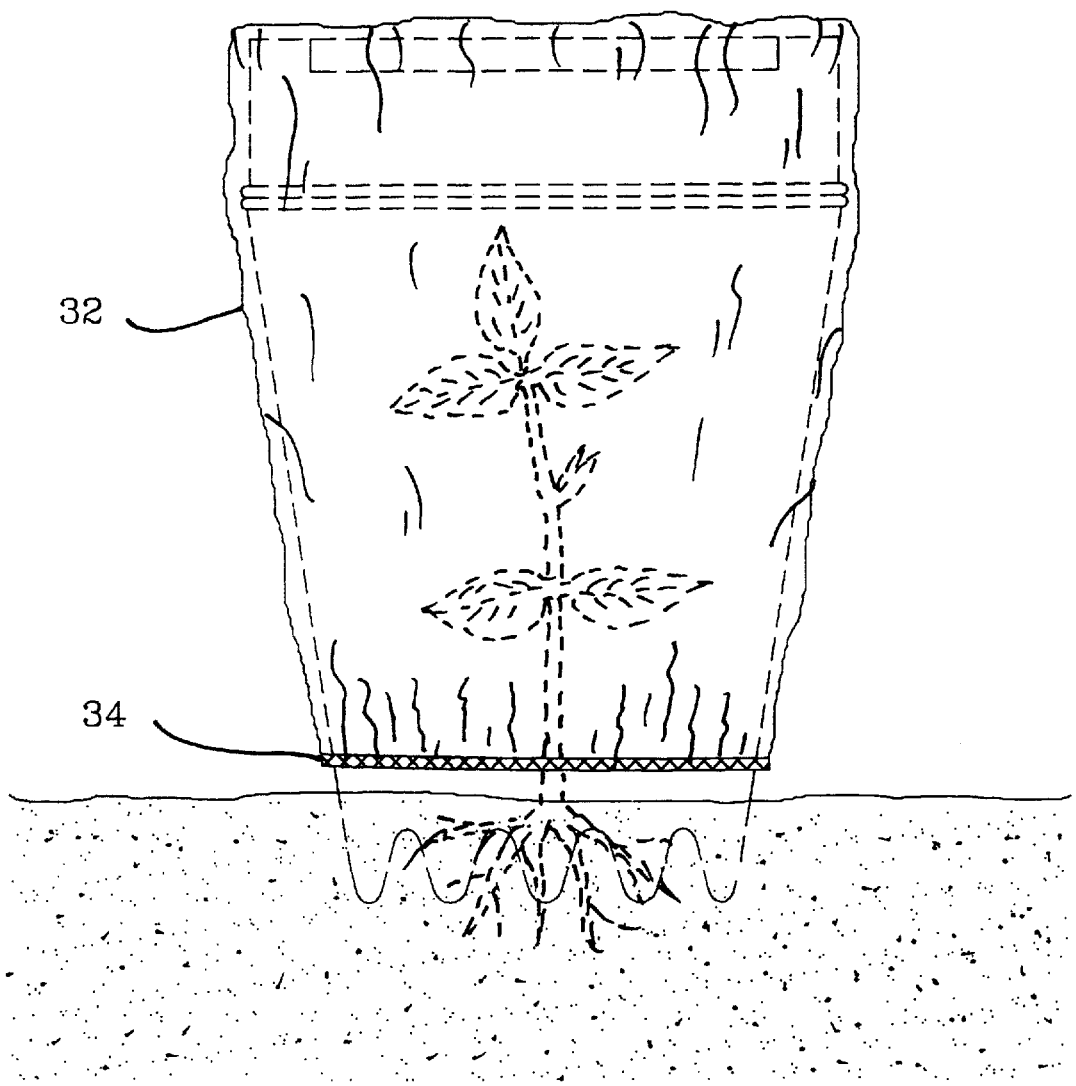
FIG. 8 is a side elevational view, showing an alternative cover design.

When it is desired to protect a plant against an overnight frost, a cover may be placed over the enclosure, as seen in FIGS. 7 and 8. In one version, seen in FIG. 8, the cover 30 comprises a rigid cylindrical structure, closed at the top and shaped to fully cover the enclosure. The cover is opaque and preferably provides a reasonable degree of insulative value. For example, the cover may be fabricated from Plexiglass (tm), rigid foam or corrugated plastic sheeting. In another version, seen in FIG. 8, the cover 32 comprises a cloth or plastic fitted sheet, with an elastic strip 34 embedded within its lower edge to retain the cover on the enclosure. The cover provides sufficient insulative value and blockage of radiant heat loss to reduce the risk of plant damage during an overnight frost.

Although the present invention has been described by way of a preferred embodiment thereof, it will be understood that numerous variations and departures from this preferred embodiment may be made, without departing from the spirit and scope of the invention, as defined in the appended claims

I claim:

1. A plant enclosure or outdoor use, comprising a hollow body having a sidewall with upper and lower rims and open upper and lower ends, with a removable lid engageable to said upper end, at least one ventilation and drainage opening extending through sinusoidal configuration that defines and an array of root growth openings extending enclosure at said lower rim to permit a plant root to grow here through.

2. An enclosure as in claim 1, wherein said lid is clear or translucent.

3. An enclosure as in claim 1, wherein said lid is characterized by water entry openings to admit water falling as rainwater or from a sprinkler.

4. An enclosure as in claim 3, wherein said lid incorporates water capture means, consisting of a recessed region of an upper surface of the lid capable of receiving and retaining water falling as rain or from a sprinkler, and said water entry openings are positioned to drain said captured water into the enclosure.

5. An enclosure as in claim 1, wherein said body is clear or translucent.

6. An enclosure as in claim 1, wherein snap-lock engagement means releasably engage said lid to said body.

7. An enclosure as in claim 1, wherein multiple ventilation and drainage openings are provided within said body, comprising an array of holes positioned partway up said sidewall.

8. An enclosure as in claim 1, wherein the position of said at least one ventilation and drainage opening permits the body to be partly buried within a garden and permit a fixed amount of water to accumulate within the base of said enclosure.

9. An enclosure as in claim 8, wherein said ventilation and drainage openings are between 4 and 5 inches above the lowermost portion of the lower rim of said body.

10. An enclosure as in claim 1, wherein said at least one ventilation and drainage opening is sized to permit entry of a variety of bees.

11. An enclosure as in claim 1, wherein said body has the shape of a truncated cone, with the wide end facing upwardly when said enclosure is installed.

12. An enclosure as in claim 1, wherein there is further provided a removable cover adapted to be temporarily placed over said enclosure for frost protection.

* * * * *